INVENTOR.
BY Reinhold Frick
C. P. Goepel
his ATTORNEY

June 19, 1945.     R. FRICK     2,378,764
DEVICE FOR THE GENERATION OF PRESSURE IN PRESSES
Filed May 7, 1941     2 Sheets-Sheet 2

Inventor
Reinhold Frick.
By *Al W Holcombe*
Attorney.

Patented June 19, 1945

2,378,764

UNITED STATES PATENT OFFICE 2,378,764

DEVICE FOR THE GENERATION OF PRESSURE IN PRESSES

Reinhold Frick, Heidenheim-on-the-Brenz, Germany, assignor to American Voith Contact Co. Inc., New York, N. Y., a corporation of New York Application May 7, 1941, Serial No. 392,339 In Germany February 19, 1940

3 Claims. (Cl. 92—49)

This invention relates to a device for the generation of pressure in presses, especially in roller presses for paper and cellulose dewatering machines, the pressure of which is generated by means of a system of levers.

It is a well known practice to use weighted levers for the generation of pressure in roller presses. The increasing width and the increasing dewatering effect of these presses needed the application of ever increasing pressures. First of all it has been tried to attain this by increasing the weights and by lengthening the weighted arm of lever. But soon a limit was reached, the transgression of which was followed by considerable disadvantages. The increase of the weights decreased the sensitiveness of the whole arrangement by the increasing inertia, making it hard to respond to variations of thickness of the layers or to the entrance of foreign matter at the nip. The lengthening of the levers exceeding a certain limit had the disadvantage that the lever of the press reached far over the space allotted to the press, limiting thus the accessibility of other parts of the machine especially of an additional press in the neighbourhood. Therefore it has been tried before to limit the length of the load lever to the length of a press by using a double lever. This device increased the pressure sufficiently and kept the lever moderately short but had the disadvantage of a bigger number of bearings which are generally designed as fulcrums for such levers. These bearings are easily dirtied by fibers during the run of a cellulose dewatering machine and wear quickly. In any case, practice has shown that each increase of the number of such bearing points in the rod system of presses is undesirable.

The present invention eliminates these disadvantages by shortening one arm of a pressure lever even with highly stressed bearings and correspondingly high pressures, instead of lengthening one of the arms of lever. The present lever has one end thereof pivotally connected to a fixed bearing and the intermediate portion of this lever is pivotally connected to the part of the press to be moved. According to the invention, the two pivots comprise two journals arranged in the lever excentrically and facing each other, one of which is engaged with the fixed bearing and the other with the movable press part. An alternate design of the device consists in rigidly securing one of the ends of a pair of journals in the fixed bearing and rotatably securing the other of the ends in the lever, and further consists in rigidly securing one of the ends of a second pair of journals in the lever and rotatably securing the other ends of said second pair in the movable press part. This design of the lever has the advantage that one arm of the lever may be shortened to any degree to make it actually possible to generate with a lever, not surpassing the length of the press in longitudinal direction of the dewatering machine, the high pressures for wide roll presses with a high dewatering effect.

The invention is shown in the drawings explaining the two arrangements of the journals according to invention. In the drawings, Fig. 1 is a sectional plan view showing one form of my improved pressure applying device, said view being taken along the lines 1—1 in Fig. 3;

The two fixed lever bearings or tines $1a$ and $1b$ are integral with the press frame fork 1, and in these bearings the ball or roller bearings $1c$ and $1d$ respectively are mounted. The forked lever 2 with its journals $2a$ and $2b$ is carried in these bearings. The journals $2c$ and $2d$, excentrically arranged to the journals $2a$ and $2b$ respectively, are inserted in the ball bearings $3a$ and $3b$ of the press part 3 to be moved. $3e$ is a threaded opening for the press rod 4. The member formed of the journals $2a$, $2c$ and the intermediate connected part $2e$ is made of one piece and inserted in the tine of lever 2, said part being secured against turning by the angular form of the centre part or by special screws $2g$. This form of construction makes it possible to change the ratio of the lever in the simplest way by replacing only one piece.

Figure 1:
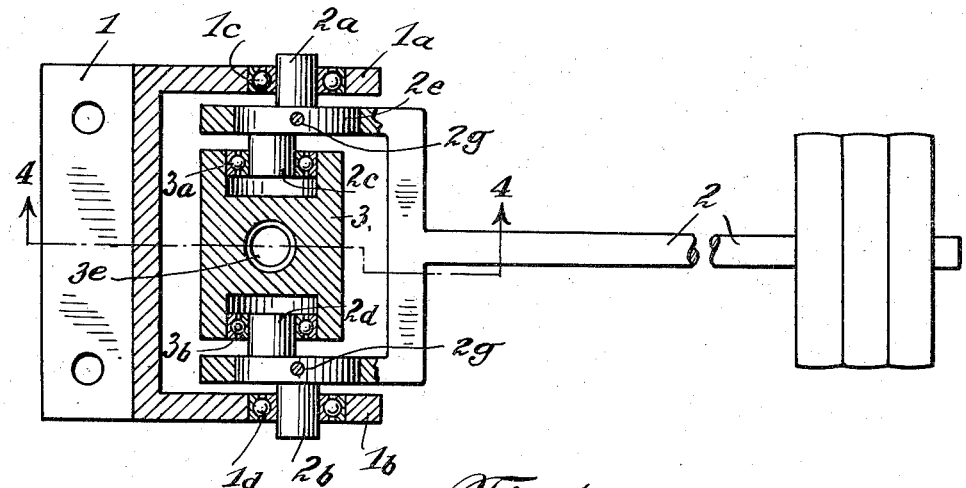
Figure 2:
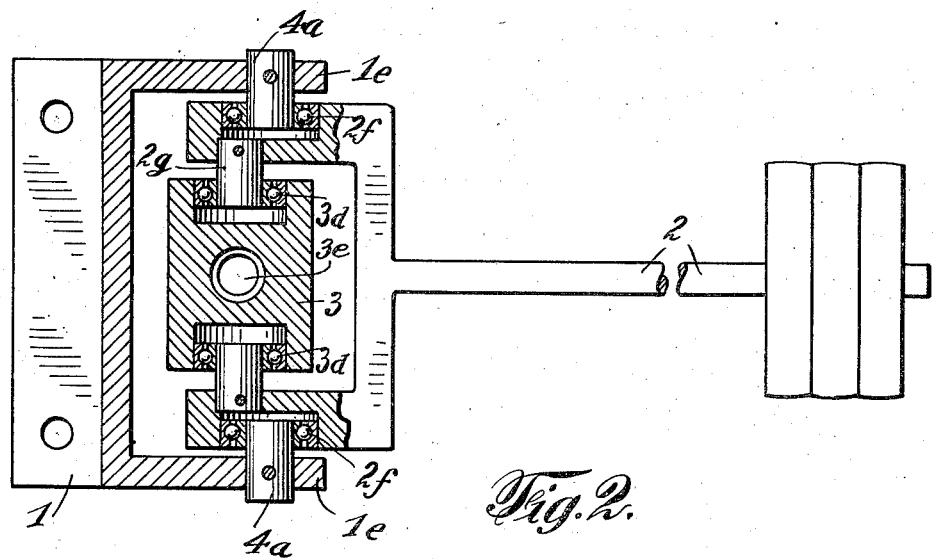
Fig. 2 is a sectional plan view of another form of my pressure applying device.

Figure 2 shows another arrangement of the journals, in which one journal $4a$ is rigidly secured in a boss or tine $1e$ of the press frame fork 1, said journal having its projecting end mounted in a ball bearing $2f$ arranged in the lever 2. A second journal $2g$ is rigidly secured in the lever itself, said second journal having the projecting end thereof mounted in a ball bearing $3d$ of the press part 3 to be moved.

Figure 3:
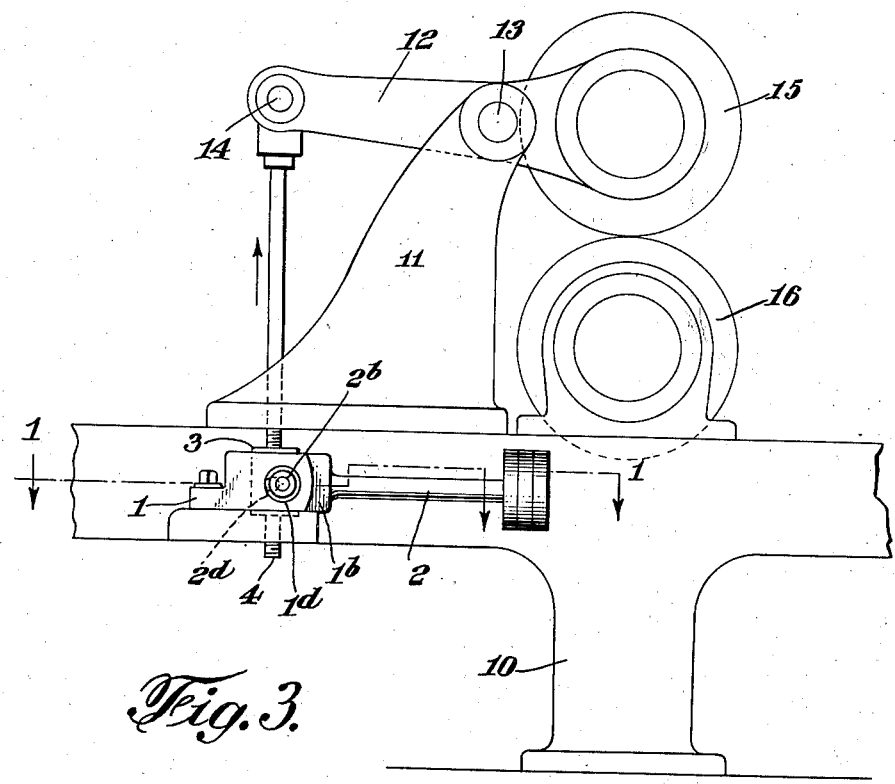
Fig. 3 is a side elevation of a portion of a press with my improved pressure applying system associated therewith.
Figure 4:
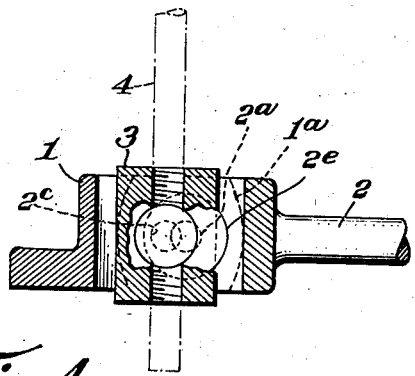
Fig. 4 is a vertical sectional detail view of the lower left-hand portion of Fig. 3, said view being taken along the line 4—4 in Fig. 1.

Both forms of the invention are adapted to be operatively associated with a conventional roller press, such as shown in Fig. 3. It is here seen that the press frame fork 1 is fixed secured to a press frame 10, which frame rotatably supports a lower press roller 16. A second bracket 11 is mounted upon the press frame 10, which bracket pivotally supports as at 13 the intermediate end of a lever 12. One end of lever 12 supports a second press roller 15 and the other end is pivotally connected to the upper end of press rod 4.

I claim:

1. In a device for the generation of pressure in roller presses of paper and cellulose dewatering machines, the combination of a framework, a stationary fork on said framework, a second fork extending laterally from said first fork, the tines of one fork intermeshing with the tines of the other, means including a pin for pivotally connecting each of the tines of the second fork respectively to an adjacent tine of the stationary fork, said connecting pivot pins being axially alined one with another, a vertically movable pressure applying link having one end thereof operatively connected to said roller press, means including a second pin for pivotally connecting the other end of said link to the tines of said second fork, said connecting second pivot pins being aligned one with another along an axis eccentric of and parallel to said axis of the first pins, the circumferential projection of said first pins upon a plane normal to said parallel axes intersecting with the circumferential projection of said second pins upon said plane whereby a short lever arm is obtained, and a weight on the laterally extending end of said second fork whereby the pressure applying link is actuated by said weighted second fork.

2. A pressure applying device according to claim 1 wherein each tine of said second fork has said first and second pivot pins rigidly connected thereto and projecting respectively from opposite faces of the second fork tine, said first and second pins being rotatably mounted respectively in one of said stationary fork tines and in said pressure applying link.

3. A pressure applying device according to claim 1 wherein each tine of said second fork has one of said pivot pins rotatably mounted therein and rigidly secured to one of said stationary fork tines, and wherein the other of said pivot pins is rigidly secured to said last named second fork tine and rotatably mounted in said pressure applying link.

REINHOLD FRICK.